CHANNELING SYSTEM FOR FREQUENCY SPECTRUM TRANSMISSION

Filed June 29, 1953 2 Sheets-Sheet 1

INVENTOR
HENRI G. BUSIGNIES
BY Ernest Fanwick
ATTORNEY

CHANNELING SYSTEM FOR FREQUENCY SPECTRUM TRANSMISSION

Filed June 29, 1953 2 Sheets-Sheet 2

INVENTOR
HENRI G. BUSIGNIES
BY
Ernest Fanwick
ATTORNEY

United States Patent Office 2,895,009

Patented July 14, 1959

2,895,009

CHANNELING SYSTEM FOR FREQUENCY SPECTRUM TRANSMISSION

Henri G. Busignies, Montclair, N.J., assignor to International Telephone and Telegraph Corporation, a corporation of Maryland Application June 29, 1953, Serial No. 364,571

13 Claims. (Cl. 179—15)

This invention relates to radio navigation systems and more particularly to a system for the transmission of radio navigation or other information which occupies an extremely narrow frequency band.

The use of very small bandwidths to provide radio navigation information is well known. The bandwidth generally agreed upon at present for use in direction finder receivers cooperating with marine beacons is many times larger than necessary for conveying the intelligence and identification of the radio beacon. Very narrow bandwidths, of the order of twenty radio frequency cycles, are sufficient to provide all the information presently provided by the radio beacon. However, the use of very narrow frequency bandwidths may result in serious errors due to night effects. Experimentation has shown that by the use of a spectrum transmission, consisting of a number of discrete frequencies transmitted in a certain bandwidth, instead of one single frequency with narrow sidebands, was very advantageous and could result in a very substantial reduction of errors caused by reflections of radio waves from obstacles or from the ionosphere. Night effects can thus be reduced to a minimum, and reliable service provided over great distance. In marine navigation it may be necessary to employ many beacons in adjacent geographical positions, and if a large frequency spectrum is used for each beacon interference occurs between adjacent beacons unless the bandwidth allotted to the service is increased or the individual frequency spectrums reduced.

One of the objects of this invention is to make use of a spectrum transmission of narrow band information by interlacing the frequencies of narrow band spectrums of a plurality of channels thus taking advantage of the desirable characteristics of wide band transmission while providing sufficient channels to accommodate the present number of marine beacons without any increase in the over-all frequency spectrum allotted to this service.

Another object of this invention is to group a large number of channels in a small available frequency spectrum, each channel transmitting a number of discrete frequencies within a predetermined bandwidth instead of a single carrier frequency with close sidebands.

A further object of this invention is to combine all the advantages of a spectrum transmission and a narrow bandwidth transmission permitting the location of a large number of channels in a small available frequency spectrum.

In accordance with a feature of this invention an interlaced channeling system for frequency spectrum transmission comprises a frequency bandwidth assigned to each discrete frequency required for the proper operation of a small bandwidth navigation system taking into account the stability of the transmitter. To receive these interlaced transmissions, a receiving circuit is provided which consists of a wide band radio frequency front end followed by a local oscillator capable of generating a group of frequencies which by the use of harmonics or modulation are properly related in frequency and phase.

The received R-F frequencies are converted into the same intermediate frequencies and are amplified, integrated and detected together; provided that the phase of each discrete frequency in a single transmission is correct with respect to all the other frequencies in the single transmission.

The above-mentioned and other features and objects of this invention will become more apparent by reference to the following description taken in conjunction with the accompanying drawings, in which.

Figure 1:
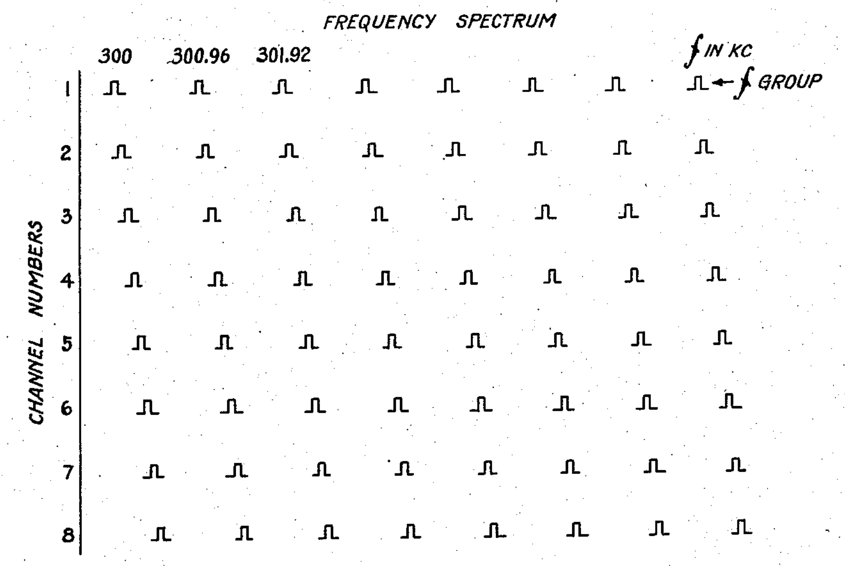
Fig. 1 is a graphic illustration of the frequency spectrum for use in the channeling system of this invention.

Referring to Fig. 1, the frequency spectrum of the channeling system for interlaced frequency spectrum transmission in accordance with the principles of this invention is shown wherein for purposes of illustration it is assumed that provision must be made for eight radio navigation beacons to transmit information on eight assigned channels. The eight channels are numbered 1 to 8 and one of the eight is assigned to each of the beacons. Each channel comprises a group of carrier frequencies, in this illustration numbering eight. The bandwidth of each signal is set at 20 cycles per second since it can be shown that a spectrum of from 3–10% of the fundamental frequency is all that is necessary to derive the benefit from the use of the spectrum transmission. Thus, the spectrum spreads over 30 kilocycles when the basic carrier frequency is 300 kilocycles. In order to provide proper guard space, it is necessary to leave an interval equivalent to 100 cycles between adjacent frequency bands in adjacent channels. Thus, referring to the frequency spectrum for channel 1, on which beacon No. 1 may operate, it is seen that the first carrier frequency energy is transmitted from 300 kilocycles to 300.02 kilocycles. The next carrier frequency energy band in channel 1 is at 300.96 kilocycles to 300.98 kilocycles and other of the several bands for channel 1 are likewise found at 300 kc. plus $n \times 0.96$ kc. Of course it should be understood that 0.96 kc. is used by way of example only and any constant frequency $k$ may be utilized. Referring to the spectrum for channel 2, transmitted by beacon No. 2, the first band in the frequency group is at a frequency of 300.12 kilocycles, thus providing a 100 cycle guard space between the first band of channel 1 and the first band of channel 2. All other bands transmitted in the allotted frequency group of channel 2 appear at 300.12 kc. plus $n \times 0.96$ kc. This system is continued through all eight channels thus providing frequency allocation for the simultaneous transmission of eight frequency groups in each of the eight channels, allowing a guard space of 100 cycles between adjacent frequencies in a total bandwidth of only 30 kilocycles. It is obvious that in any one channel the transmissions will extend over substantially the total bandwidth of 30 kilocycles while the information will be carried by a predetermined number of frequency carriers, each one only 20 cycles in bandwidth.

Figure 2:
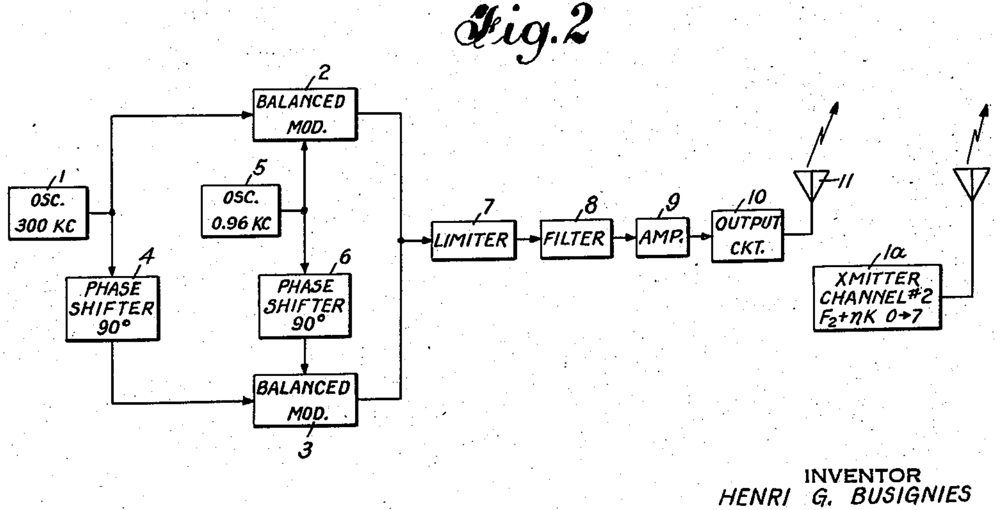
Fig. 2 is a schematic illustration in block form of one embodiment of a transmitter in accordance with the principles of this invention.

Referring to Fig. 2, one embodiment of a beacon or other transmitter for use in accordance with the principles of this invention is shown in block form wherein, for purposes of simplicity and explanation, it is assumed that the transmitter will operate in a frequency spectrum assigned to channel No. 1 of Figure 1. Other transmitters may operate in the frequency spectrum assigned to the other channels as shown at 1*a*. A source of 300 kilocycle energy is provided by an oscillator 1 which is coupled to a first balanced modulator 2 and to a second balanced modulator 3 through a 90° phase shift network 4. A source of frequency group oscillations of .96 kilocycle is provided by a second oscillator 5 which is also coupled to balanced modulator 2 and to balanced modulator 3 through a 90° phase shift network 6. Thus, it is seen that the output from balanced modulator 2 comprises the 300 kilocycle energy from oscillator 1 modulated by the .96 kilocycle energy and harmonics thereof from oscillator 5. By this arrangement a series of harmonic frequencies is provided from which the eight carrier frequencies are obtained. These outputs of the two balanced modulators are coupled to a limiter 7 to render the different carrier frequency bands of channel 1 of substantially equal intensity, and to a filter 8 which passes the desired eight frequencies starting at 300 kilocycles spaced .96 kilocycle apart. This group of frequencies comprise the spectrum of channel No. 1. Obviously, if this same transmitter is to operate on channel No. 2 it is only necessary to preset the first oscillator 1 at 300.12 kilocycles instead of the illustrated 300 kilocycle operation. The eight frequency groups from filter 8 are coupled to an amplifier 9 and thence through output circuit 10 to antenna 11.

While I have used the frequency spectrum of 30 kilocycles and a basic carrier frequency of 300 kilocycles, and an illustration of eight channels each with a group of eight frequency bands at a specified spacing, it should be clearly understood that these figures are given only by way of example and may be varied widely without departing from the invention.

Figure 3:
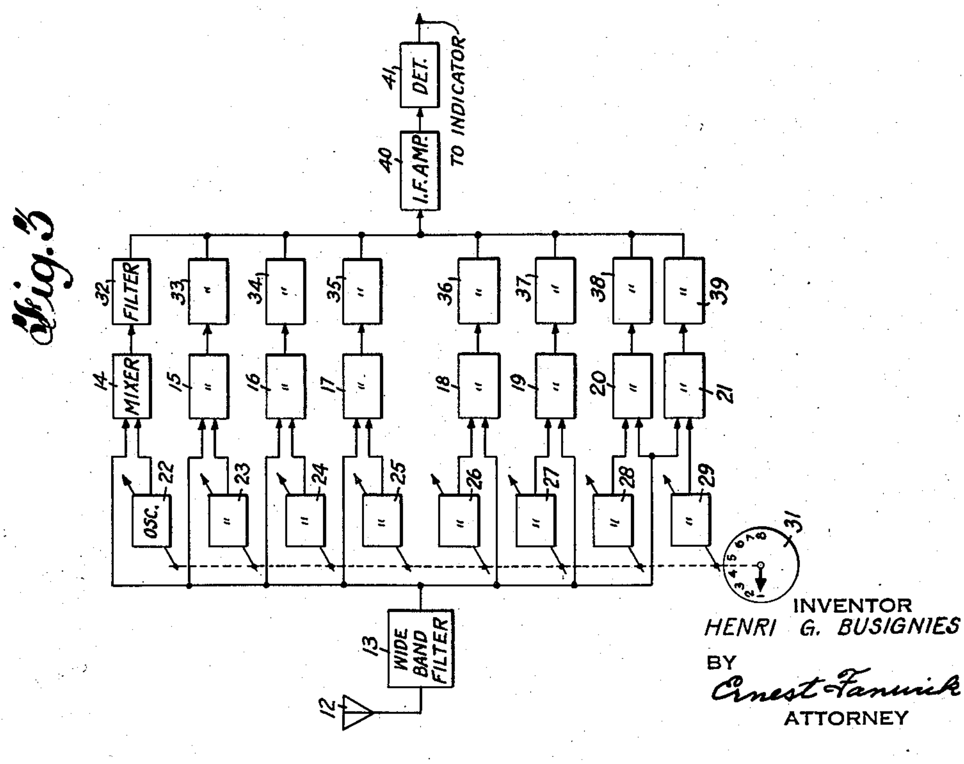

Referring to Fig. 3 of the drawing, one embodiment of the receiver to cooperate with the transmitter shown in Fig. 2 is illustrated. The signals radiated by the transmitter of Fig. 2 are coupled from the receiving antenna 12 to a wide band filter 13 which is capable of passing the complete frequency spectrum transmission of all channels. The output of the wide band filter 13 is coupled to mixer circuits 14–21 along with the output of variable oscillators 22–29. Each of the oscillators 22–29 is preset to the channel that it is desired to receive by means of mechanical linkage 30 and the setting appears on the dial indicator 31. Assume for purposes of illustration that it it is desired to receive channel No. 1. The oscillators 22–29 are set to the frequencies for channel No. 1 that is the eight oscillators 22 to 29 are spaced 0.8 kc. apart starting at 310 kc. for oscillator 22 and going up to 315.6 kc. for oscillator 29. The outputs of the oscillators 22–29 are coupled to the mixers 14–21 whose output comprises eight intermediate frequencies spaced .16 kilocycle apart. Of coure it is understood that if the receiver of Fig. 3 is to receive the transmissions of channel No. 2 oscillator 22 is set to 310.12 kc. and oscillators 23–29 are spaced 0.8 kc. apart yielding the same intermediate frequencies from the outputs of mixers 14–21. The output from each of the intermediate frequency mixers 14–21 which are spaced 0.16 kc. apart are filtered in circuits 32–39 and the combined outputs are coupled to an intermediate frequency amplifier 40 having a wide frequency characteristic. The amplified intermediate frequencies are coupled through a detector 41 and to any utilizing means such as an indicator.

Figure 4:
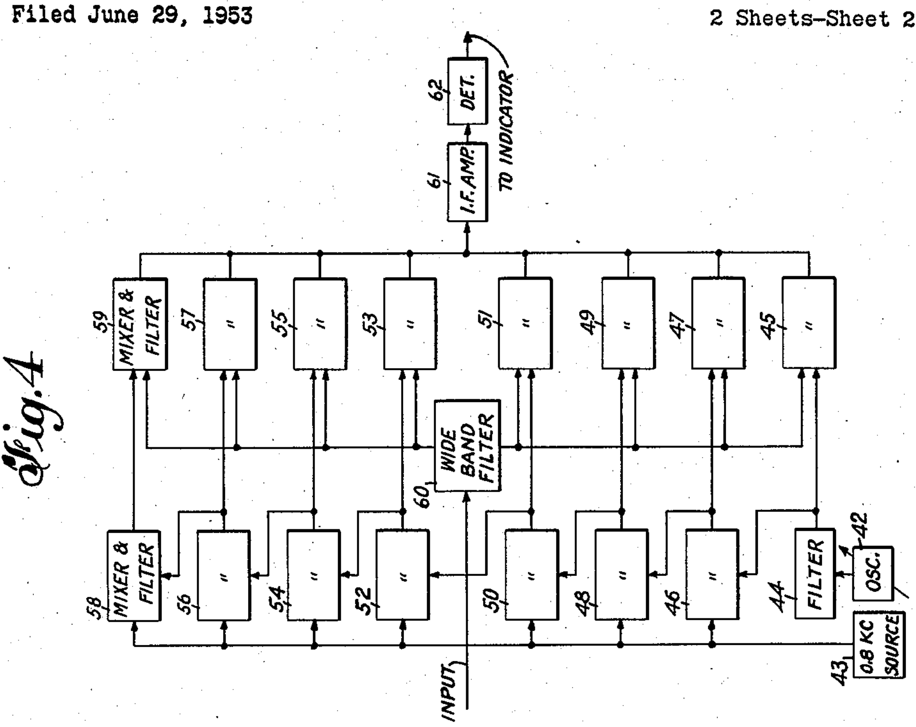
Figs. 3 and 4 are schematic illustrations in block form of alternate embodiments of receiver equipment for use in receiving the transmissions of the transmitter shown in Fig. 2.

Referring to Fig. 4, an alternate embodiment of a receiver for use with the transmitter shown in Fig. 2 is shown comprising a single variable frequency oscillator 42 and an 0.8 kilocycle source 43. The oscillator 42 is set to the basic frequency of the channel to be received and is coupled to a filter 44 whose output is coupled to a mixer and filter 45 and also to a second mixer and filter 46. The mixer and filter 46 combines the output of the .8 kilocycle source 43 with the filtered output of oscillator 42 and couples the basic frequency plus .8 kc. to mixer and filter circuit 47. The output of mixer and filter 46 is also coupled to mixer and filter circuit 48 where again the .8 kilocycle frequency is mixed to provide a signal having a frequency equal to the basic frequency plus 2 x .8 kc. Each of the mixer and filter circuits 50, 52, 54, 56, and 58 act in a similar manner to the mixer and filter circuit 46 while the mixer and filter circuits 49, 51, 53, 55, 57, and 59 act in a manner similar to the mixer and filter circuit 45 to provide eight intermediate frequencies, one for each of the discrete carrier frequencies within each channel. If it is desired to change the channel on which the receiver is operating, it is only necessary to vary the basic frequency provided by oscillator 42. In a manner similar to the operation of the receiver shown in Fig. 3 the input signal is coupled to a wide band filter 60 whose output is also coupled to mixer and filters 45 et seq. to provide the intermediate frequencies which are coupled to the intermediate frequency amplifier 61 to detector 62 and to the utilizing circuits.

While I have described above the principles of my invention in connection with specific apparatus, it is to be clearly understood that this description is made only by way of example and not as a limitation to the scope of my invention as set forth in the objects thereof and in the acompanying claims.

I claim:

1. A multichannel intelligence transmission and reception system comprising at least a first transmitter for the first of said channels including means to generate a first plurality of different spaced carrier frequencies, each of said first plurality of carrier frequencies being modulated by the intelligence of said first channel, and a single means coupled to the generator means of said first transmitter to simultaneously transmit each of said first plurality of carrier frequencies, a second transmitter for the second of said channels including means to generate a second plurality of different spaced carrier frequencies, each of said second plurality of spaced carrier frequencies being spaced from and interleaved with each of said first plurality of spaced carrier frequencies and each of said second plurality of carrier frequencies being modulated by the intelligence of said second channel, and means coupled to the generator means of said second transmitter to simultaneously transmit each of said second plurality of carrier frequencies, and a single receiver in spaced relation with each of said transmitters for selectively detecting said first and said second plurality of spaced carrier frequencies.

2. A system according to claim 1, wherein the generator means of each of said transmitters include a basic frequency source, an increment frequency source and means to modulate said basic frequency with said increment frequency and harmonics of said increment frequency to produce the spaced carrier frequencies of each of said plurality of different spaced carrier frequencies, said modulator means including a pair of balanced modulators, one of said pair of balanced modulators being coupled directly to said basic frequency source and said increment frequency source and the other of said balanced modulators being coupled through a 90-degree phase shift network to said basic frequency source and said increment frequency source.

3. A channeling system for frequency spectrum transmission comprising a plurality of transmitters, one associated with each of said channels, each transmitter including a separate output means and means coupled in common to said output means to produce a plurality of predetermined discrete narrow band carrier frequencies within a predetermined frequency spectrum, each of said narrow band carrier frequencies containing the total message information of its respective channel and each of the discrete narrow frequency bands of each of said channels being selected to interlace with the narrow frequency bands of all other channels and a single receiving means for detecting said interlaced transmission, means to locally produce a plurality of beat frequencies, one for each of said discrete frequencies within any channel, means to mix said detected signals and said locally produced frequencies to produce a plurality of different intermediate frequencies, one for each discrete frequency within said channel, and means to detect the information of said signal from said intermediate frequencies, said means to produce a plurality of local frequencies including a plurality of variable oscillators and means to couple the tuning mechanism of each of said oscillators whereby the frequency produced by any one oscillator is relative to the frequencies produced by all other oscillators.

4. A channeling system for frequency spectrum transmission comprising a plurality of transmitters, one associated with each of said channels, each transmitter including a separate output means and means coupled in common to said output means to produce a plurality of predetermined discrete narrow band carrier frequencies within a predetermined frequency spectrum, each of said narrow band carrier frequencies containing the total message information of its respective channel and each of the discrete narrow frequency bands of each of said channels being selected to interlace with the narrow frequency bands of all other channels and a single receiving means for detecting said interlaced transmission, means to locally produce a plurality of beat frequencies, one for each of said discrete frequencies within any channel, means to mix said detected signals and said locally produced frequencies to produce a plurality of different intermediate frequencies, one for each discrete frequency within said channel, and means to detect the information of said signal from said intermediate frequencies, said means to produce said plurality of local frequencies including a variable oscillator for producing a basic frequency, a source of constant frequency, means to mix harmonics of said constant frequency source with the output of said variable oscillator to produce said plurality of frequencies.

5. A channeling system for frequency spectrum transmission comprising a plurality of transmitters, one associated with each of said channels, each transmitter including a separate output means and means coupled in common to said output means to produce a plurality of predetermined discrete narrow band carrier frequencies within a predetermined frequency spectrum, each of said narrow band carrier frequencies containing the total message information of its respective channel and each of the discrete narrow frequency bands of each of said channels being selected to interlace with the narrow frequency bands of all other channels and a single receiving means for detecting said interlaced transmission, means to locally produce a plurality of beat frequencies, one for each of said discrete frequencies within any channel, means to mix said detected signals and said locally produced frequencies to produce a plurality of different intermediate frequencies, one for each discrete frequency within said channel, and means to detect the information of said signal from said intermediate frequencies, said means to produce a plurality of local frequencies including a variable oscillator, a source of constant frequency, means to mix the output of said oscillator and said constant source to produce one of said local frequencies and means to mix the output of said first mixer and said constant source to produce another of said local frequencies.

6. A channeling system for frequency spectrum transmission comprising a plurality of transmitters, one associated with each of said channels, each transmitter including a separate output means and means coupled in common to said output means to produce a plurality of predetermined discrete narrow band carrier frequencies within a predetermined frequency spectrum, each of said narrow band carrier frequencies containing the total message information of its respective channel and each of the discrete narrow frequency bands of each of said channels being selected to interlace with the narrow frequency bands of all other channels and a single receiving means for detecting said interlaced transmission, means to locally produce a plurality of beat frequencies, one for each of said discrete frequencies within any channel, means to mix said detected signals and said locally produced frequencies to produce a plurality of different intermediate frequencies, said means to produce a plurality of different intermediate frequencies from said source of locally produced frequencies and said received signals further including means to vary the frequency of said locally produced oscillations to obtain the same intermediate frequencies for each of said channels.

7. A transmitter for producing a plurality of predetermined discrete narrow band carrier frequencies each carrier containing the total message information within a predetermined frequency spectrum comprising a basic frequency source, an increment frequency source and means to modulate said basic frequency with said increment frequency and harmonics of said increment frequency to produce said discrete frequencies, said modulator means including a pair of balanced modulators, one of said pair of balanced modulators being coupled directly to said basic frequency source and said increment frequency source and the other of said balanced modulators coupled through a 90 degree phase shift network to said basic frequency source and said increment frequency source.

8. A single receiver spaced from and cooperating with a plurality of transmitters emitting an interlaced channel carrier frequency spectrum type transmission comprising a source of interlaced channel carrier frequency spectrum type transmission having a plurality of discrete carrier frequencies on each of said channels single means to detect said frequency spectrum transmission, local oscillator means to produce a plurality of frequencies, means to mix said discrete carrier frequencies of a given channel with said plurality of locally produced frequencies to obtain a plurality of different predetermined intermediate frequencies and means to detect the information from said plurality of intermediate frequencies.

9. In a multichannel intelligence transmission and reception system, at least a first transmitter for the first of said channels including means to generate a first plurality of different spaced carrier frequencies, each of said first plurality of carrier frequencies being modulated by the intelligence of said first channel, and a single means coupled to the generator means of said first transmitter to simultaneously transmit each of said first plurality of carrier frequencies, a second transmitter for the second of said channels including means to generate a second plurality of different spaced carrier frequencies, each of said second plurality of spaced carrier frequencies being spaced from and interleaved with each of said first plurality of spaced carrier frequencies and each of said second plurality of carrier frequencies being modulated by the intelligence of said second channel, and means coupled to the generator means of said second transmitter to simultaneously transmit each of said second plurality of carrier frequencies.

10. A single receiver disposed in spaced relation with at least two transmitters for selectively detecting a first plurality of spaced carrier frequencies and a second plurality of spaced carrier frequencies, said first and second plurality of carrier frequencies being in spaced and interleaved relationship with respect to each other, comprising a single means to detect said first and second plurality of spaced carrier frequencies, means to produce a plurality of local oscillator frequencies equal in number to the spaced carrier frequencies of one of said plurality of spaced carrier frequencies, a plurality of means to heterodyne said detected signals and said local oscillator frequencies to produce a plurality of different intermediate frequencies equal in number to the spaced carrier frequencies of one of said plurality of spaced carrier frequencies, means coupled to said means to produce to select said local oscillator frequencies for coupling to said heterodyning means to selectively detect said first and said second plurality of spaced carrier frequencies, and means coupled in common to said heterodyning means to detect the intelligence of the selected plurality of spaced carrier frequencies.

11. A receiver according to claim 10, wherein said selecting means includes a means to tune a plurality of local oscillators simultaneously.

12. A receiver according to claim 10, wherein said means to produce includes a variable frequency source, a stable frequency source producing a stable frequency and a plurality of harmonics of said stable frequency, means coupled to said variable frequency source and said stable frequency source to combine said stable frequency and said harmonics with the output of said variable frequency source to produce a plurality of local oscillator frequencies, and said selecting means includes means to vary said variable frequency source.

13. A multichannel intelligence transmission and reception system comprising at least a first transmitter for the first of said channels including means to generate a first plurality of different spaced carrier frequencies, each of said first plurality of carrier frequencies being modulated by the intelligence of said first channel, and a single means coupled to the generator means of said first transmitter to simultaneously transmit each of said first plurality of carrier frequencies, a second transmitter for the second of said channels including means to generate a second plurality of different spaced carrier frequencies, each of said second plurality of spaced carrier frequencies being spaced from and interleaved with each of said first plurality of spaced carrier frequencies, and each of said second plurality of carrier frequencies being modulated by the intelligence of said second channel, and means coupled to the generator means of said second transmitter to simultaneously transmit each of said second plurality of carrier frequencies, and a single receiver in spaced relation with each of said transmitters for selectively detecting said first and said second plurality of spaced carrier frequencies including a single means to detect said first and second plurality of spaced carrier frequencies, means to produce a plurality of local oscillator frequencies equal in number to the spaced carrier frequencies of one of said plurality of spaced carrier frequencies, a plurality of means to heterodyne said detected signals and said local oscillator frequencies to produce a plurality of different intermediate frequencies equal in number to the spaced carrier frequencies of one of said plurality of spaced carrier frequencies, means coupled to said means to produce to select said local oscillator frequencies for coupling to said heterodyning means to selectively detect said first and said second plurality of spaced carrier frequencies, and means coupled in common to said heterodyning means to detect the intelligence of the selected plurality of spaced carrier frequencies.

References Cited in the file of this patent

UNITED STATES PATENTS

| | | |
|---|---|---|
| 1,910,977 | Weis Jr. | May 23, 1933 |
| 2,426,460 | Lewis | Aug. 26, 1947 |
| 2,429,726 | Lewis | Oct. 28, 1947 |
| 2,430,296 | Lewis | Nov. 4, 1947 |
| 2,437,281 | Tawney | Mar. 9, 1948 |
| 2,497,859 | Boughtwood | Feb. 21, 1950 |
| 2,559,644 | Landon | July 10, 1951 |
| 2,586,475 | Milliquet | Feb. 19, 1952 |
| 2,611,825 | Harris | Sept. 23, 1952 |

FOREIGN PATENTS

| | | |
|---|---|---|
| 150,155 | Australia | Feb. 19, 1953 |